United States Patent

[11] 3,551,713

| [72] | Inventor | Franklin A. White<br>P.O. Box 4, Sunnymead, Calif. 92388 |
|---|---|---|
| [21] | Appl. No. | 677,390 |
| [22] | Filed | Oct. 23, 1967 |
| [45] | Patented | Dec. 29, 1970 |

[54] MOTOR HOOK-UP RING
6 Claims, 2 Drawing Figs.

[52] U.S. Cl............................................... 310/71,
339/95, 339/220
[51] Int. Cl............................................... H02k 7/00
[50] Field of Search........................................... 310/71, 91,
89; 339/95, 97, 220, 256, 219, 260

[56] References Cited
UNITED STATES PATENTS
| 1,756,332 | 4/1930 | Becker | 310/71 |
| 2,361,448 | 10/1944 | Beal | 339/219 |
| 2,715,714 | 8/1955 | Pavlinetz | 339/95 |
| 2,755,399 | 7/1956 | Phillips | 310/71 |
| 3,253,247 | 5/1966 | Vos | 339/95 |

Primary Examiner—Milton O. Hirshfield
Assistant Examiner—R. Skudy
Attorney—Lyon & Lyon ABSTRACT: A device for completing the connections of a three-phase electrical motor. The device comprises a nonconductive ring having a plurality of connectors corresponding in number and position to the wires extending out of the motor, the ring having perforations through which the motor wires may be passed to permit connection to their respective connectors. The ring is prewired to establish the desired internal and external circuit connections.

PATENTED DEC 29 1970

3,551,713

FRANKLIN A. WHITE
INVENTOR

BY Lyon & Lyon

ATTORNEYS

MOTOR HOOK-UP RING

After a three-phase electrical motor has been wound or rewound, the various windings terminate in electrical leads which extend out of the motor and which must be connected together to form the proper internal circuitry, and which also must be connected to external leads so that the motor can easily be connected to a power supply or the like. Ordinarily, this hookup of the motor is done by hand, usually either by soldering or welding the wires together and to suitable external leads. While this results in a satisfactory motor hookup, it is quite time consuming and requires a relatively skilled worker to perform the soldering or welding operations. Consequently, this final motor hookup constitutes an appreciable factor in the overall cost of the completed motor.

According to the present invention, a hookup ring is provided which permits the majority of the electrical connections to be made beforehand by conventional mass production techniques thus considerably reducing costs. Moreover, the device permits a completely unskilled worker to complete the motor hookup in a simple and easy manner thereby considerably reducing the costs. The preforming of many of the connections also increases the reliability of the hookup as it reduces the possibility of poor soldered joints and the like. The ring is provided with a plurality of holes through which the wires may be passed and corresponding electric terminals to which they may be connected. External leads may also be connected to these terminals.

It is therefore an object of the present invention to provide a device for use in simply and quickly completing the hookup of an electric motor.

The objects and advantages of the present invention will become apparent upon reference to the accompanying description and drawings in which.

Figure 1:
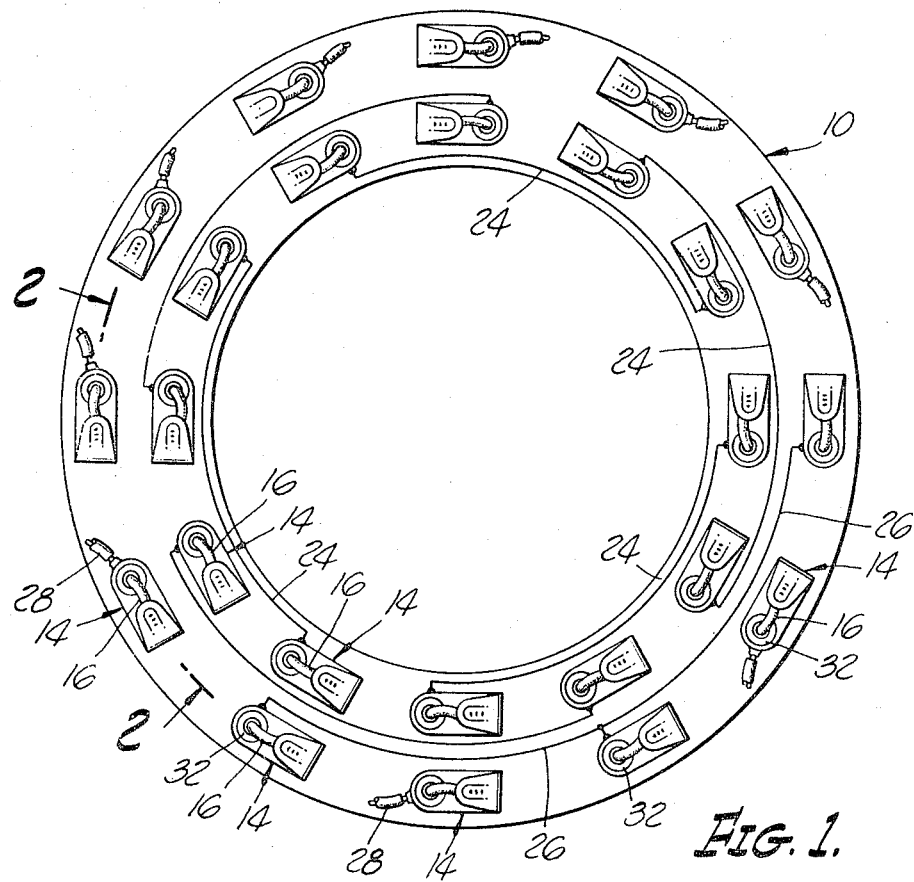
FIG. 1 is a top plan view of the device of the present invention.

Turning now to the several figures, a ring or disc 10 of any suitable nonconductive material is provided with a plurality of holes 12 therethrough. The ring 10 is provided with a configuration to conform generally to that of the motor with which it is to be used and the holes 12 are drilled or otherwise formed in the ring 10 at positions corresponding to the location of the lead wires extending outwardly from the coils of the motor with which the ring is to be used. As shown, the ring 10 is provided with 24 holes arranged in two rows of 12 each thus conforming to the number of leads present in a conventional three-phase electric motor. It should be understood, of course, that the ring 10 can be provided with any number of holes needed and that the present drawing and description are illustrative only and not limiting.

Adjacent to each of the holes 12 there is positioned an electrical terminal such as a connector or clip 14 for making electrical connection to the lead wire 16 passing through the respective hole 12. Each clip 14 is constructed of a conductive metal such as copper or the like and is tensioned so that the tip 18 thereof will be stressed into engagement with the base 20. Preferably, the tip 18 or the base 20, or both, are provided with serrations or teeth 22 which serve to strip the insulation from the wire 16 or pierce the insulation so as to make electrical contact with the conductor.

As can be seen in FIG. 1, the various clips 14 associated with the innermost row of holes 12 are electrically connected together in a predetermined pattern by conductors 24. The conductors 24 may be formed by printed circuit techniques or may be conventional conductors bonded or attached to the ring 10 in any conventional manner. The pattern of the conductors 24 establishes the proper internal connections for the motor as will be obvious to those skilled in the art. A similar conductor 26 is used to electrically couple certain of the clips 14 associated with the outer row of holes on the ring 10 for the same purpose. It will be apparent, of course, that the pattern of these connections may vary from motor to motor and those shown are only illustrative of the manner in which such connections can be accomplished. It will also be obvious that by initially making these connections on the ring 10, the time required for final hookup of the motor is greatly reduced. All that is required is that the appropriate wire 16 be pulled through the hole 12 and passed through the clip 14 whereby an electrical connection is made.

Figure 2:
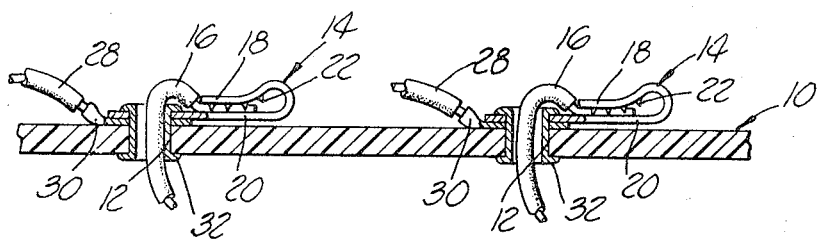
FIG. 2 is a cross-sectional view taken along lines 2-2 of FIG. 1.

In order to still further simplify the final hookup of the motor, external leads are also connected to the ring 10 and clips 14 before the actual hookup is performed. This is preferably accomplished as shown in FIG. 2 by providing the external leads 28 with eyelets 30 that fit over the hole 12 either above or below the base 20 of its respective clip 14. The clips 14 and eyelets 30 can then be fixedly attached to the ring 10 by means of rivets 32 preferably of conductive material. The other ends of the conductors are also preferably provided with eyelets, clips or the like so that they can easily be connected to the power source.

From the foregoing description it can be seen that a device has been provided that greatly simplifies the final hookup of an electric motor. The majority of the necessary electrical connections are made during the assembly of the hookup ring and thus can be accomplished by mass production methods so that the cost of the ring can be made quite low. When final hookup is to be performed, the ring 10 is positioned over the motor and the various leads 16 pulled through their corresponding holes 12 and then pulled through the clips 14 so that they are electrically connected to the circuitry on the ring 10. While one type of clip has been shown, it will be understood that other types of terminals could be used. Of course, if desired, soldering or welding could be used to reinforce the connection between the wire and the clip.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A device for use in connecting lead wires from the windings of a three-phase electric motor in a desired pattern and to external leads comprising: a member of nonconductive material for overlying said lead wires, said member being provided with a plurality of terminal means for making electrical connection with said lead wires; a plurality of electrical conductors on said member electrically interconnecting selected ones of said terminal means to establish the desired internal connections of said windings of said three-phase motor upon connection of said lead wires of said windings to said terminal means; each of said external leads being connected to a selected one of said terminal means.

2. The device of claim 1 wherein said nonconductive member is in the form of a ring, said terminal means being formed in a plurality of circular rows in said ring.

3. The device of claim 2 wherein each of said terminal means is a clip for firmly grasping its respective lead wire and making electrical connection thereto.

4. The device of claim 3 wherein said clip is provided with means for piercing the insulation from said lead wire.

5. The device of claim 3 wherein said clips are attached to said nonconductive member by rivets passed through holes formed in said ring.

6. The device of claim 5 wherein said rivets also hold said external leads in position relative to said holes and said clips.